United States Patent
Kenwright

(10) Patent No.: US 10,036,499 B2
(45) Date of Patent: Jul. 31, 2018

(54) EAR CLAMP

(71) Applicant: OETIKER SCHWEIZ AG, Horgen (CH)

(72) Inventor: Eric Thomas Kenwright, Barrie (CA)

(73) Assignee: OETIKER SCHWEIZ AG (CH)

( * ) Notice: Subject to any disclaimer, the term of this patent is extended or adjusted under 35 U.S.C. 154(b) by 0 days.

(21) Appl. No.: 14/441,873

(22) PCT Filed: Aug. 14, 2013

(86) PCT No.: PCT/EP2013/067023
§ 371 (c)(1),
(2) Date: May 11, 2015

(87) PCT Pub. No.: WO2015/022024
PCT Pub. Date: Feb. 19, 2015

(65) Prior Publication Data
US 2016/0146384 A1    May 26, 2016

(51) Int. Cl.
*F16L 33/025* (2006.01)

(52) U.S. Cl.
CPC ................. *F16L 33/025* (2013.01)

(58) Field of Classification Search
CPC .............. F16L 33/025; B65D 63/02
USPC ................... 24/20 R, 20 CW, 20 W
See application file for complete search history.

(56) References Cited

U.S. PATENT DOCUMENTS

| | | | | |
|---|---|---|---|---|
| 282,466 A * | 7/1883 | Preston | ................ | B65D 63/12 24/20 R |
| 690,819 A * | 1/1902 | Anderson | ............ | B65D 63/12 24/20 CW |
| 2,614,304 A * | 10/1952 | Oetiker | ................ | F16L 33/025 24/20 CW |
| 2,876,514 A * | 3/1959 | Murphy | ............... | F16L 33/025 24/20 CW |
| 3,082,498 A * | 3/1963 | Oetiker | ................ | F16L 33/025 24/20 CW |
| 3,087,221 A * | 4/1963 | Armstrong | ........... | F16L 33/025 24/20 CW |
| 3,106,757 A * | 10/1963 | Smith | ................... | F16L 33/025 24/20 CW |
| 3,235,925 A | 2/1966 | Gerhardt et al. | | |

(Continued)

FOREIGN PATENT DOCUMENTS

| | | | | |
|---|---|---|---|---|
| DE | 869583 C | * | 3/1953 | ........... F16L 33/025 |
| DE | 1133952 B | | 7/1962 | |
| EP | 0499819 A1 | | 8/1992 | |

OTHER PUBLICATIONS

Search Report and Written Opinion for International Patent Application No. PCT/EP2013/067023; dated Apr. 22, 2014.

*Primary Examiner* — David Bochna
(74) *Attorney, Agent, or Firm* — Barnes & Thornburg LLP

(57) ABSTRACT

An open ear clamp having a clamping device like a so-called Oetiker ear. To make the installation of the clamp on a pipe easier, the clamp is pre-deformed, for example, in the course of production, to such an extent that the clamp surrounds the pipe for which the clamp is intended without play. Because of the elasticity produced in the clamp by this pre-deformation, the clamp still can be moved effortlessly to the installation location on the pipe and yet is retained there in the position of the clamp and in the desired orientation.

4 Claims, 1 Drawing Sheet

(56) References Cited

U.S. PATENT DOCUMENTS

| | | | | |
|---|---|---|---|---|
| 3,295,176 | A | * | 1/1967 | Bright .................. F16L 33/021 24/20 R |
| 3,303,669 | A | * | 2/1967 | Oetiker ................ F16L 33/006 24/20 CW |
| 3,402,436 | A | * | 9/1968 | Oetiker ................ F16L 33/025 24/20 CW |
| 3,574,355 | A | * | 4/1971 | Oetiker ................ F16L 33/025 285/256 |
| 4,222,155 | A | | 9/1980 | Oetiker |
| 4,583,773 | A | * | 4/1986 | Janssen ................ F16L 13/14 24/20 CW |
| 4,711,001 | A | | 12/1987 | Oetiker |
| 4,832,380 | A | * | 5/1989 | Oetiker ................ F16L 23/04 285/328 |
| 5,070,580 | A | * | 12/1991 | Oetiker ................ F16L 33/025 24/20 CW |
| 5,195,788 | A | * | 3/1993 | Oetiker ................ F16L 33/025 285/252 |
| 5,251,360 | A | * | 10/1993 | Putz .................... F16L 33/025 24/20 CW |
| 7,631,908 | B2 | * | 12/2009 | Meier .................. F16B 2/005 24/20 CW |

* cited by examiner

EAR CLAMP

PRIORITY CLAIM

This patent application is a U.S. National Phase of International Patent Application No. PCT/EP2013/067023, filed 14 Aug. 2013, the disclosure of which is incorporated herein by reference in its entirety.

SUMMARY

Disclosed embodiments provide a combination of a tube and an ear clamp for sealing the tube against an object inserted into the tube. Also disclosed is a method for sealing a tube against the object, by means of an ear clamp wherein the assembly is facilitated.

In the disclosed embodiments, the ear-like tightening structure, which is known per se, serves a double purpose, namely first to adapt the diameter of the clamp to the diameter of the tube by pre-deforming the ear, optionally done during manufacture, and subsequently to tighten the clamp in the mounted condition. With the pre-deformed ear, the elasticity thereof is exploited in that the ear can be moved to the desired position during assembly although it sits of the tube already so tightly that it cannot slip inadvertently.

BRIEF DESCRIPTION OF THE DRAWINGS

The invention will now be explained in more detail with reference to the drawings which show cross-sections of an ear clamp in the closed but not yet tightened condition, wherein.

DETAILED DESCRIPTION

Figure 1:
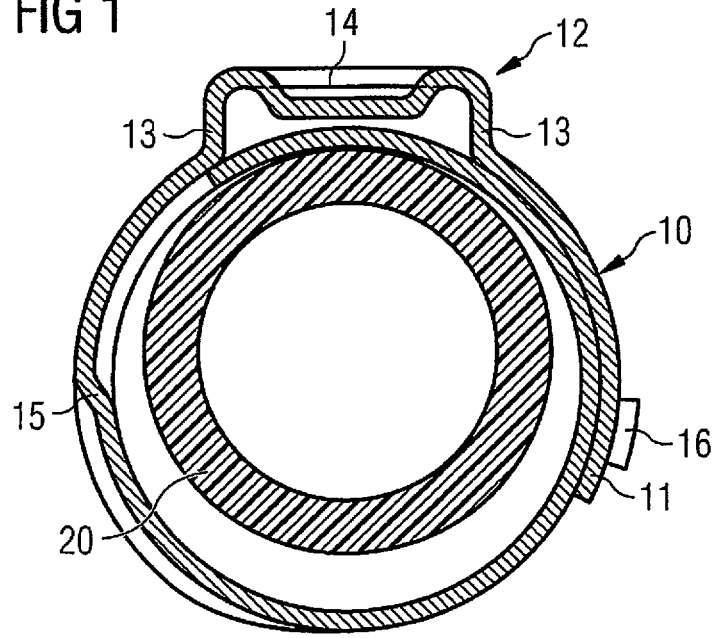
FIG. 1 relates to a conventional ear clamp.
Figure 2:
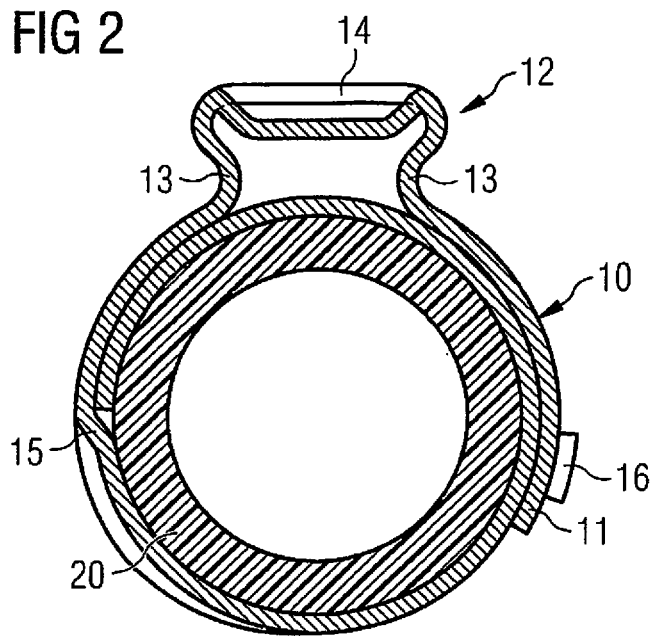
FIG. 2 relates to an ear clamp in accordance with a disclosed embodiment.

The ear clamp shown in FIGS. 1 and 2 of the drawing is made of a clamping band 10 which, starting from its outer end 11 which has a window (not shown), has a tightening structure, a so-called "Oetiker-ear" 12, with two radially outward extending legs 13 and a web 14 interconnecting the outer ends of the legs, an inward projecting step 15, and a hook 16 which, in the closed condition shown, passes through the window in the outer clamping band end. A depression is stamped in the web 14 of the ear 12 to prevent buckling. In both figures, the ear clamp surrounds a tube 20 at a position where an object (not shown), such as a bent metal pipe, is inserted into the tube.

In the conventional case illustrated in FIG. 1, there is a play of at least 1 mm between the inner diameter of the ear clamp and the outer diameter of the tube 20, for which the ear clamp is intended, to make sure that, irrespective of tolerances in the dimensions of the tube 20 and of the clamp itself, the clamp can be moved along the tube to the desired mounting position in the area of the object inserted into the tube. In this position, the clamp is then tightened around the tube 20 by narrowing the ear 12, for instance using a pliers-type tightening tool, to make a sealed connection between the tube and the object.

Since the ear clamp surrounds the tube 20 with play, it must be held in place at the mounting position during the tightening process. This is cumbersome especially in manual assembly as it is necessary to hold also the tube and the inserted object in the desired positions relative to one another.

The difficulty in the handling during tightening of the clamp is particularly great when the tube 20 has a smooth surface, as is true with the PEX (polyethylene) materials often used in the plumbing trade, and specifically when the tube extends vertically at the assembly site.

The mentioned difficulty is avoided in the ear clamp shown in FIG. 2. Here, the ear 12 is pre-deformed prior to placing the camp on the tube 10 to such an extent that the clamp surrounds the tube free of play. The pre-deformation, which may be done during the manufacturing process of the clamp, can be readily performed such that the elasticity rendered by the pre-deformed ear permits the clamp to placed on the tube and to be moved to the mounting position without effort, yet holds the clamp in this position and in the orientation of the ear 12 suitable for tightening.

Ear clamps, such as known from e.g. U.S. Pat. No. 4,711,001, are used for tightly connecting a tube and an object, e.g. a bent metallic pipe, inserted into an end of the tube. The known ear clamp is made of a clamping band in which an ear-like tightening structure having two outward extending legs interconnected by a web is formed.

During assembly, there is a difficulty in that the clamp must be held in its mounting position while it is tightened. This difficulty is particularly great when the tube has a smooth surface, as is true with materials used in the plumbing trade, such as PEX (cross-linked polyethylene), or when the tube extends vertically, and is specifically cumbersome during manual assembly and constricted mounting space.

Any attempt to fit the inner diameter of the clamp exactly to the outer diameter of the tube will fail due to the unavoidable tolerances that exist in both the clamps themselves and the tubes used. Even careful manufacture will regularly leave a play of at least 1 mm between the inner diameter of the clamp and the outer diameter of the tube for which the clamp is intended.

U.S. Pat. No. 3,235,925 A and U.S. Pat. No. 4,222,155 A disclose further ear clamps. The drawings of these documents show the clamps as surrounding the tube free of play already in the non-tightened condition. The drawings, however, are idealized representations which do not show the situation in the practical use of the hose clamp. The problems explained above exist also here.

REFERENCE NUMBERS 10 clamping band
11 outer clamping band end
12 ear
13 leg
14 web
15 step
16 hook
20 tube

The invention claimed is:
1. A combination comprising:
a tube; and
a corresponding ear clamp,
wherein the ear clamp is configured to correspond to the tube by being sized to seal the tube against an object inserted into the tube,
wherein the ear clamp comprises a clamping band including an ear-like tightening structure with two outward extending legs interconnected by a web, wherein manufacture of the ear clamp pre-configures the ear-like tightening structure to be pre-deformed so that:
the pre-configuration of the ear clamp permits the ear clamp to be placed on the corresponding tube and to be moved to a mounting position as a result of elasticity rendered by the pre-deformed ear,
the ear clamp fits on the tube substantially free of play prior to tightening of the ear clamp around the corresponding tube, and
the ear clamp is held in the mounting position and in an orientation of the ear suitable for tightening by further deformation of the tightening structure until a final, installed clamping pressure is obtained.

2. The combination of claim 1, wherein the web includes a depression stamped therein.

3. A method for sealing a tube against an object to be inserted into the tube by an ear clamp, wherein the ear-like tightening structure comprises two outward extending legs interconnected by a web, the method comprising:

pre-deforming an ear-like tightening structure of an ear clamp clamping band during manufacture so that the pre-configuration of the ear clamp permits the clamp to be placed on the corresponding tube and to be moved to a mounting position as a result of elasticity rendered by the pre-deformed ear, the ear clamp fits on the tube substantially free of play prior to tightening of the ear clamp around the corresponding tube, and the ear clamp is held in the mounting position and in an orientation of the ear suitable for tightening;
moving the clamp to a final, installed position on the tube during installation of the ear clamp on the tube; and
tightening the clamp by further deformation of the tightening structure until a final, installed clamping pressure is obtained.

4. The method of claim 3, wherein the web includes a depression stamped therein.

* * * * *